(12) United States Patent
Hopwood

(10) Patent No.: US 7,082,985 B2
(45) Date of Patent: Aug. 1, 2006

(54) MOULDING APPARATUS

(75) Inventor: Robert T. Hopwood, Gloucestershire (GB)

(73) Assignee: TBS Engineering Limited, Gloucestershire (GB)

( * ) Notice: Subject to any disclaimer, the term of this patent is extended or adjusted under 35 U.S.C. 154(b) by 31 days.

(21) Appl. No.: 10/433,456

(22) PCT Filed: Dec. 10, 2001

(86) PCT No.: PCT/GB01/05441

§ 371 (c)(1),
(2), (4) Date: Nov. 6, 2003

(87) PCT Pub. No.: WO02/45886

PCT Pub. Date: Jun. 13, 2002

(65) Prior Publication Data

US 2004/0069437 A1 Apr. 15, 2004

(30) Foreign Application Priority Data

Dec. 9, 2000 (GB) ................................. 0030063.2

(51) Int. Cl.
*B22D 41/00* (2006.01)
(52) U.S. Cl. ........................ 164/335; 164/337; 164/333
(58) Field of Classification Search ................ 164/335, 164/333, 133, 109, 337
See application file for complete search history.

(56) References Cited

U.S. PATENT DOCUMENTS

| 4,175,725 A | | 11/1979 | Cattano |
| 4,289,193 A | * | 9/1981 | Stamp ........................ 164/109 |
| 4,425,959 A | | 1/1984 | Mund |
| 5,240,063 A | | 8/1993 | Hopwood |
| 5,520,238 A | | 5/1996 | Hopwood |

FOREIGN PATENT DOCUMENTS

JP  1-195662  * 8/1989

OTHER PUBLICATIONS

Patent Abstracts of Japan, vol. 013, No. 490 (E-841), Nov. 7, 1989 & JP 01 195662 A (Shin Kobe Electric Mach Co Ltd) Aug. 7, 1989 abstract -&JP 01 195662 A (Shin Kobe Electric Mach Co Ltd) Aug. 7, 1989 figure 2.

* cited by examiner

*Primary Examiner*—Kevin Kerns
*Assistant Examiner*—I.-H. Lin
(74) *Attorney, Agent, or Firm*—Young & Thompson

(57) ABSTRACT

A moulding apparatus (10) for moulding a strap on to a group of battery plates including a mould block (14) with moulds (24), each of which has an inlet weir (28) and an outlet weir (29). The ridge (30) of these weirs is effectively a knife edge but includes a thermal break. This construction allows rapid processing whilst avoiding the formation of solid tails.

11 Claims, 3 Drawing Sheets

MOULDING APPARATUS

CROSS-REFERENCE TO RELATED APPLICATION

This application is a 371 of PCT/GB01/05441 filed on Dec. 10, 2001.

BACKGROUND OF THE INVENTION

This invention relates to apparatus for moulding a strap on a group of battery plates.

The most common method of moulding straps on groups of battery plates is to invert the group and dip the lugs into a mould filled with molten, but cooling, lead. With thin lugs this is relatively straight forward, because there is sufficient heat in the cooling lead to fuse them and form a good joint. However, as the size of the lugs increase, so does the capacity of the effective heat sink which has been dipped into the molten lead, with the result that the lead can be cooled so rapidly that the submerged surface of the lugs does not melt and no proper joint is formed. In an attempt to overcome this, systems have been developed whereby lead is flowed through the mould, at least during an initial dipping step, so that the lead temperature is initially kept up, but a problem is experienced with lead tails being formed at the outlet, which somehow have to be broken off and removed before the next cycle can take place. Most current proposals suggest the use of the stripper plate, but this provides uneven castings and can even damage the castings. The cycle time is, as a result rather high. Another approach is to interpose a heated triangular section at the lead outlet which provides an adequate transition across the interface between the cooled mould and the heated lead outlet. This however reduces the local effectiveness of the mould cooling and once more increases the cycle time.

SUMMARY OF THE INVENTION

The present invention consists in apparatus for moulding a strap onto a group of battery plates including a coolable mould, having inlet and outlet weirs, interposed between a heatable lead inlet and a heatable lead outlet whereby lead can be flowed through the mould over the respective weirs characterised in that the interfaces between the mould and the respective adjacent lead inlet/outlet are insulated to provide a temperature discontinuity.

Preferably the temperature change at each interface is between 100° C. to 275° C. It is further preferred that the interface at the top of each weir is less than 10 mm thick.

The mould and the inlet and outlet may be spaced to provide a thermal break, in which case the spacing at the weir may be less than 1 mm. Insulating material may be positioned at least between the bulk of the mould and the inlet and outlets.

Preferably the top of each weir is profiled to act as a knife edge.

There maybe more than one weir along the length of the mould and in a particularly preferred configuration the inlet and outlet weirs are offset with respect to each other and, conveniently, with respect to the dipped position of a lug on the battery plate. There may be more inlet than outlet weirs, for example there may be three inlet weirs with two outlet weirs positioned opposite the spaces between the inlet weirs.

Although the invention has been described above, it is to be understood that it covers any inventive combination of the features set out above or in the following description.

BRIEF DESCRIPTION OF THE DRAWINGS

The invention may be performed in various ways, but a specific embodiment will now be described, with reference to the accompanying drawings, in which.

DESCRIPTION OF THE PREFERRED EMBODIMENTS

Figure 1:
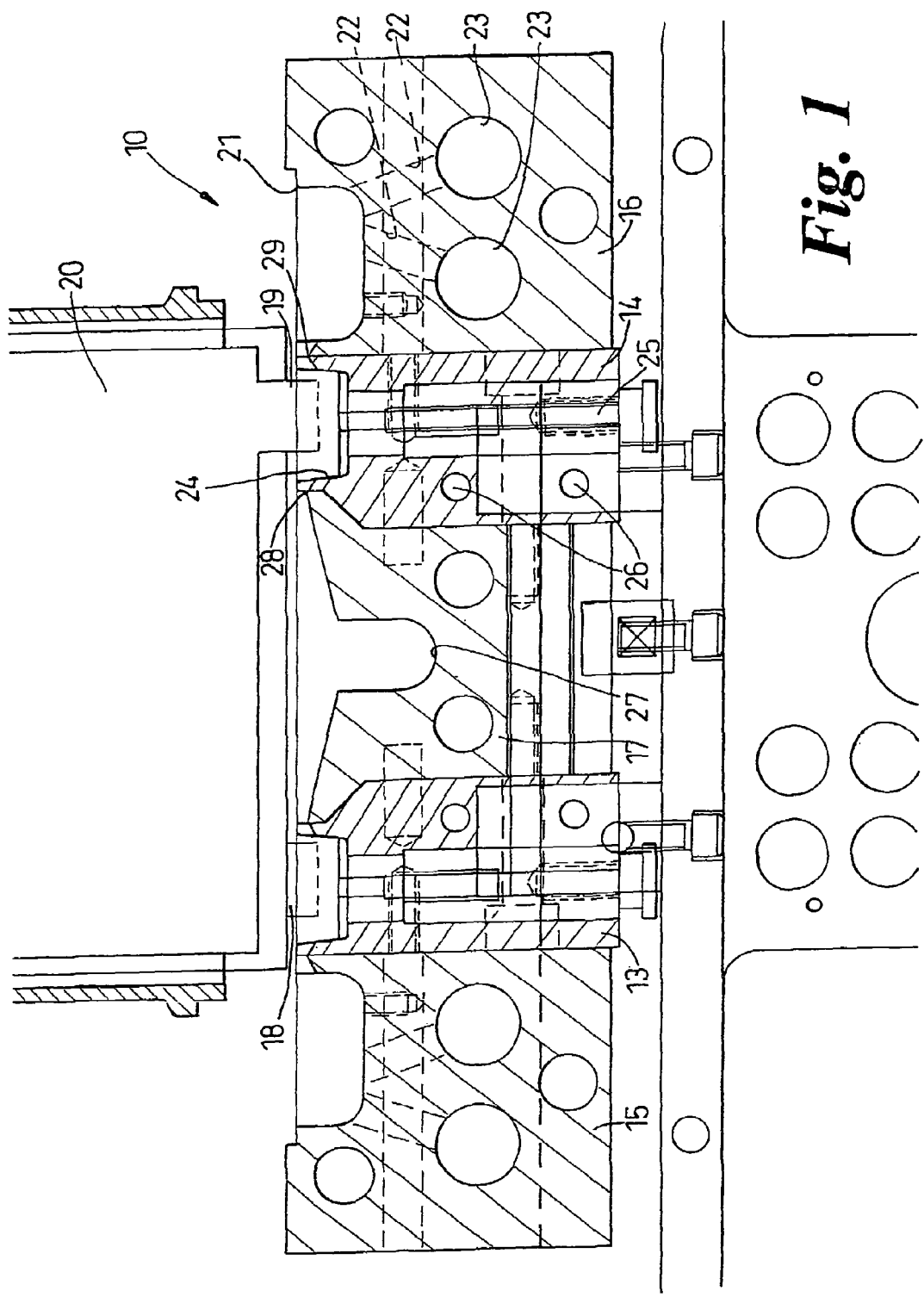
FIG. 1 is a vertical section through a part of a moulding apparatus for moulding a strap on to a group of battery plates, with the group indicated.

Broadly the apparatus, which is generally indicated at 10, comprises a pair of mould blocks 13,14, respective lead inlet blocks 15, 16 and a common lead outlet block 17. The combination of 13,15, and 17, operates identically to the combination 14,16,17 and the construction and operation of the apparatus 10 will be described solely in connection with the latter combination. Two combinations are required, so that straps can be formed simultaneously on the positive lugs 18 and the negative lugs 19 of the battery plates 20.

The lead block 16 has a lead reservoir, in the form of channel 21 into which lead can upwardly well through shafts 22 that are connected to respective supply pipes 23, which are in turn supplied by a lead pot not shown. The bulk of the block 16 is maintained at an elevated temperature of around 400 to 500° C., which is substantially above the melting point of the lead alloys used in the process, which melt, typically, between 250 and 310° C.

Figure 2:
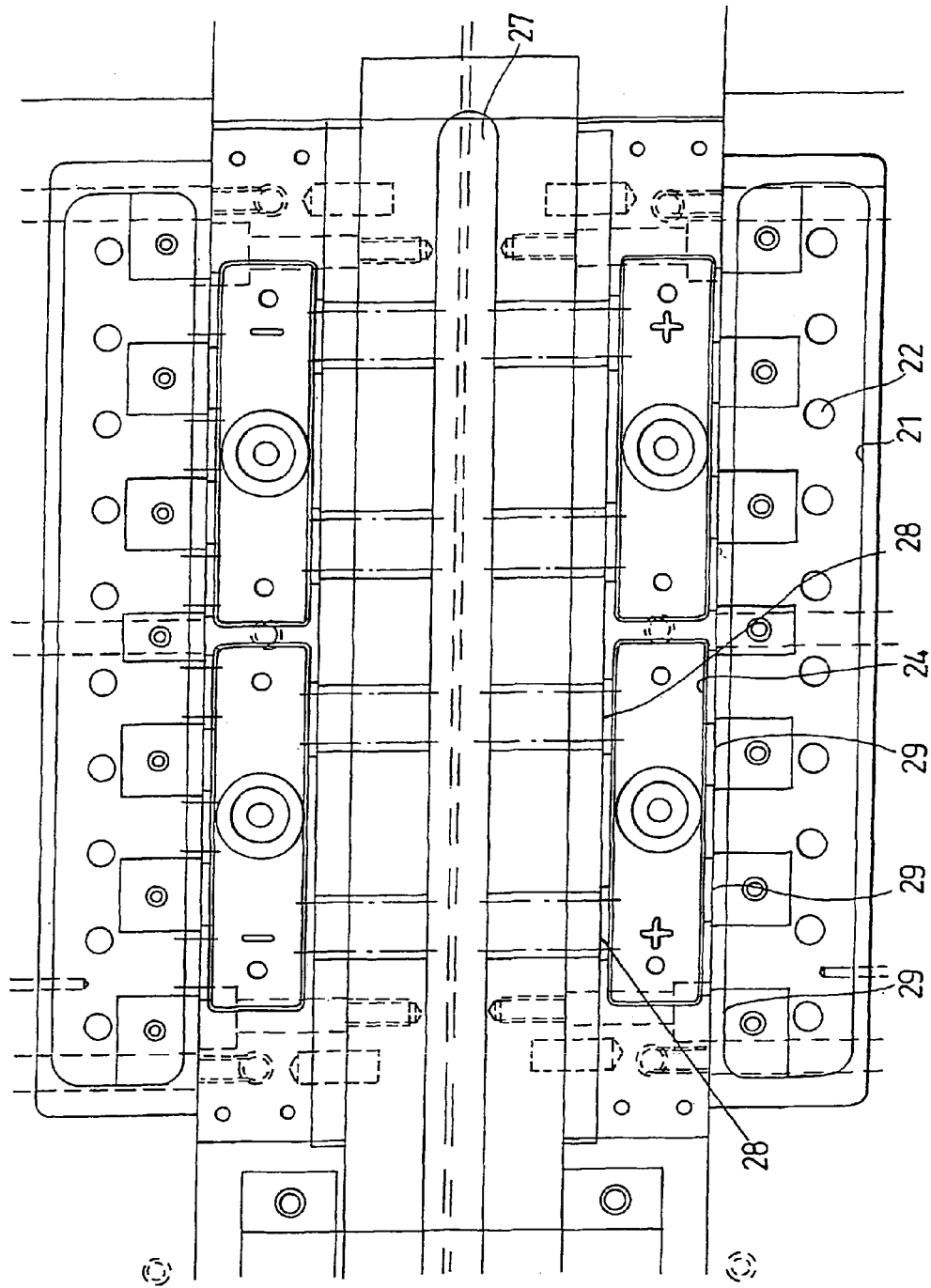
FIG. 2 is a view from above of FIG. 1.

The mould block 14 is formed with a mould cavity 24 that defines the desired shape of the strap, as can best be seen in FIG. 2, and is provided with the ejector pin 25 for pushing out the moulded strap from the mould 24. The mould 24 is cooled by water flowing through passages 26. The temperature of the mould block is determined by the required cycle time and the capacity of the mould 24, but typically it would be of the order of 150° C.

The outlet block 17 includes a central outlet channel 27, which receives lead passing out of the mould 24 as it overflows.

Each mould 24 has an inlet weir 29 and an outlet weir 28, which together define the upper level of the mould 24. These weirs will be described in more detail below.

In use, the lugs 18 are dipped to a first level, DIP1, with the lead still flowing so some heating of the lugs can occur and then they are moved to level DIP2 (shown in FIG. 1) as the lead flow is switched off. Any excess lead spills back over the weirs 28, 29 so that the lead in the mould then takes up the level indicated by the solid line between weirs 28, 29.

Figure 3:
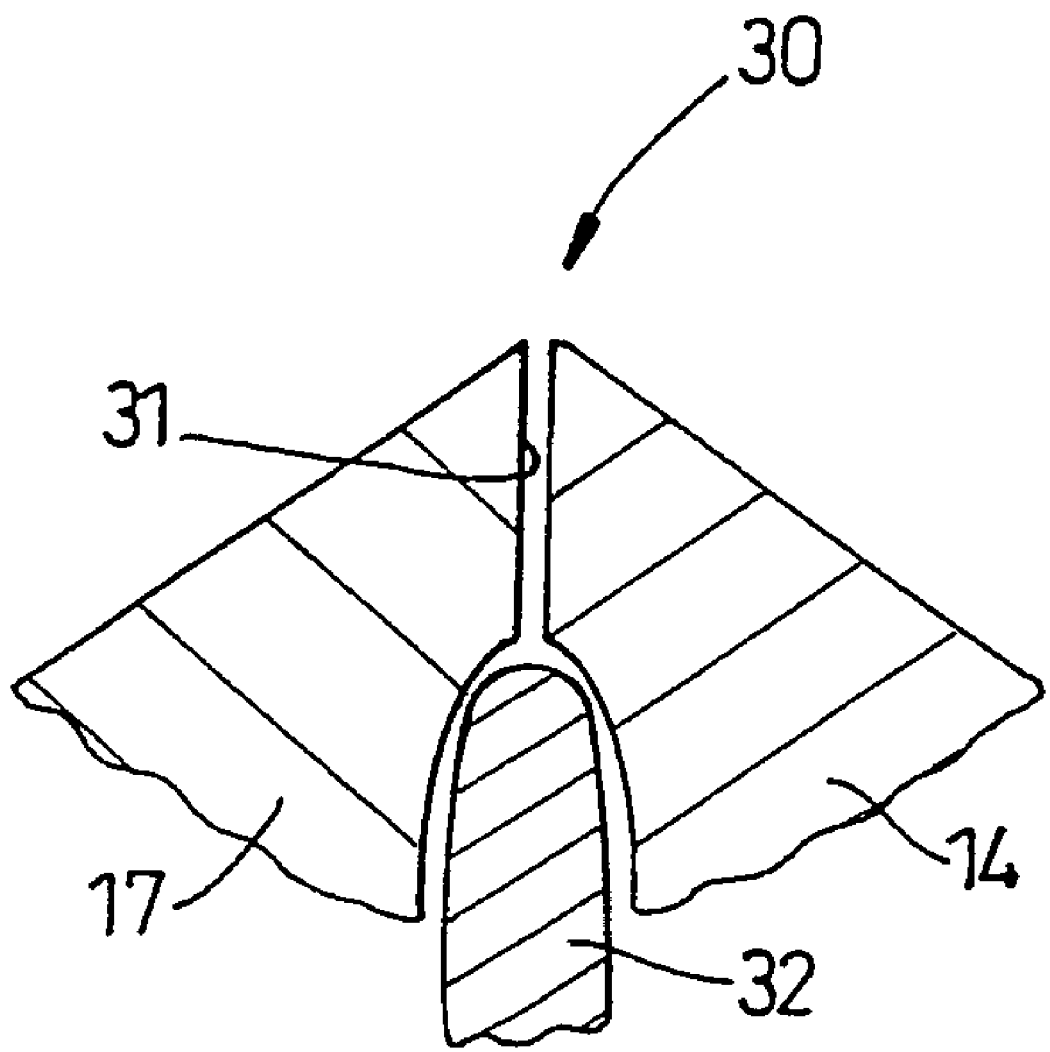
FIG. 3 is an enlarged cross-section showing a schematic view of the top of a weir.

FIG. 3 illustrates the top of each of the weirs 28, 29, but for convenience weir 28 will be described specifically. It will be seen that the adjacent portions of the mould block 14 and the lead outlet block 17 are upwardly inclined so that they together form what is effectively a knife edge ridge 30. The blocks 17 and 14 are in fact spaced apart at the ridge, in order to form the necessary thermal break to allow a significant temperature discontinuity, but the space 31 is less than 0.1 mm wide, because lead will not flow down a gap which is less than 0.1 mm wide. From just below the ridge 30 each of the blocks is opened out to accommodate a sheet of thermally insulating material 32. The knife edge ridge 30 allows for a clean break to occur between the casting and any out flowing lead, whilst the thermal break 31–32 enables a sufficiently large temperature discontinuity between the mould block 14 and the outlet block 17 for any lead on the left hand side of the ridge 30 to be melted and hence prevent the formation of solid tails, which block the outlet from the weir. Conversely the thermal break 31, 32 enables the mould 14 to be held at a temperature which will enable rapid moulding to take place, once the lead flow stops.

It will be understood that the weir 29 is a mirror image in that the hot side will be on the right and the cold side will be an the left.

The actual temperatures required will depend on the particular lead alloy being moulded, but as has already been mentioned the blocks 16 and 17 are preferably kept at around 400 to 500° C. For good cycle times the mould block should be in the region of 150° C. and so the temperature change at the weirs, across the thermal breaks, should be between 100° C. to 250° C. It will be appreciate that at the weirs the 'hot' side will be cooler than the bulk of its block, whilst on the 'cool' side the weir will be somewhat hotter than the bulk of its block The applicants have determined that a cycle time of around 20 seconds can be achieved with such an arrangement. Competing apparatus cycles at nearer 1 minute.

Thus the applicants have determined, surprisingly, that by using weirs with significant temperature discontinuities at both the inlet and outlet of a mould, good quality castings can be achieved with large lug plates, with a rapid cycle time.

The invention claimed is:

1. An apparatus for molding a strap onto a group of battery plates, comprising:
   a coolable mold having a first mold cavity therein;
   a heatable lead inlet; and
   a heatable lead outlet,
   said mold being between said inlet and said outlet and defining (a) at one side of said first mold cavity an inlet weir having a top over which lead passes from said inlet to said first mold cavity and (b) at a side of said cavity opposite said one side an outlet weir having a top over which the lead passes from said first mold cavity to said outlet, and
   wherein interfaces between said mold and said inlet and between said mold and said outlet are insulated to provide a temperature discontinuity at each respective said weir.

2. The apparatus of claim 1, wherein a temperature change at the interfaces is between 100° C. and 250° C.

3. The apparatus of claim 1, wherein the interfaces are less than 10 mm thick.

4. The apparatus of claim 1, wherein said mold is spaced from said inlet at said inlet weir by a gap that is more than zero and less than 0.1 mm wide.

5. The apparatus of claim 1, wherein said mold is spaced from said outlet at said outlet weir by a gap that is more than zero and less than 0.1 mm wide.

6. The apparatus of claim 1, wherein said top of said inlet weir is pointed.

7. The apparatus of claim 6, wherein said mold is spaced from said outlet at said outlet weir by a gap that extends through said pointed top.

8. The apparatus of claim 1, wherein said top of said outlet weir is pointed.

9. The apparatus of claim 8, wherein said mold is spaced from said outlet at said outlet weir by a gap that extends through said pointed top.

10. An apparatus for molding a strap onto a group of battery plates, comprising:
    a first coolable mold;
    a first heatable lead inlet;
    a heatable lead outlet,
    said first mold being between said first inlet and said outlet and defining (a) a first inlet weir between said first inlet and said first mold and having a top over which lead passes from said first inlet to said first mold and (b) a first outlet weir between said first mold and said outlet and having a top over which lead passes from said first mold to said outlet;
    a second coolable mold;
    a second heatable lead inlet;
    said second mold being between said second inlet and said outlet on a side of said outlet opposite said first mold, said second mold defining (a) a second inlet weir between said second inlet and said second mold and having a top over which lead passes from said second inlet to said second mold and (b) a second outlet weir between said second mold and said outlet and having a top over which lead passes from said second mold to said outlet;
    wherein each of said first and second inlet weirs and said first and second outlet weirs has a pointed top and is insulated at said pointed top to provide a temperature discontinuity.

11. The apparatus of claim 10, wherein each said pointed top includes a gap that extends through said pointed top.

* * * * *